United States Patent [19]

James et al.

[11] Patent Number: 5,498,512
[45] Date of Patent: Mar. 12, 1996

[54] PHOTOGRAPHIC ELEMENT HAVING A TRANSPARENT MAGNETIC RECORDING LAYER

[75] Inventors: Robert O. James; Lawrence A. Rowley; George L. Oltean, all of Rochester, N.Y.

[73] Assignee: Eastman Kodak Company, Rochester, N.Y.

[21] Appl. No.: 402,265

[22] Filed: Mar. 10, 1995

[51] Int. Cl.⁶ .............................. G03C 1/76; G11B 5/708
[52] U.S. Cl. .......................... 430/496; 430/140; 430/523; 430/501; 252/62.59; 428/694 BB
[58] Field of Search ...................................... 430/140, 523, 430/496, 501; 252/62.59; 428/694 BB

[56] References Cited

U.S. PATENT DOCUMENTS

| | | | |
|---|---|---|---|
| 3,782,947 | 1/1974 | Krall | 430/495 |
| 4,279,945 | 7/1981 | Audran et al. | 430/140 |
| 4,302,523 | 11/1981 | Audran et al. | 430/140 |
| 4,917,952 | 4/1990 | Katamoto et al. | 428/403 |
| 4,990,276 | 2/1991 | Bishop et al. | 252/62.54 |
| 5,147,768 | 9/1992 | Sakakibara | 430/501 |
| 5,229,259 | 7/1993 | Yokota | 430/140 |
| 5,252,441 | 10/1993 | James et al. | 430/140 |
| 5,382,494 | 1/1995 | Kudo et al. | 430/140 |

*Primary Examiner*—Charles L. Bowers, Jr.
*Assistant Examiner*—Mark F. Huff
*Attorney, Agent, or Firm*—Robert A. Gerlach

[57] ABSTRACT

A photographic element having a light-sensitive layer and a transparent magnetic recording layer, the transparent magnetic recording layer comprising ferromagnetic particles having a ferromagnetic core and a shell of tin oxide or metal antimonate in a binder.

19 Claims, No Drawings

PHOTOGRAPHIC ELEMENT HAVING A TRANSPARENT MAGNETIC RECORDING LAYER

FIELD OF THE INVENTION

This invention relates to photographic elements and more particularly to photographic elements having a light-sensitive silver halide layer and a transparent magnetic recording layer.

DESCRIPTION OF RELATED ART

It has been difficult to provide information exchange between photographic films eg., color negative or color reversal films and cameras or photofinishing equipment. However, recent significant developments in this area have occurred through the development of transparent magnetic recording elements across the entire surface of photographic film base such as cellulose acetate and polyesters such as PET and PEN. By using ferromagnetic powders eg., Co-surface treated-$\gamma$-$Fe_2O_3$ at about 50 mg/sq m in a thin layer, e.g., 0.8 to 2 μm thick on the surface of the film base opposite the silver halide emulsion, it is possible to record and playback digitally coded information by devices such as cameras and photofinishing apparatus. Prior art includes: U.S. Pat. Nos. 3,782,947; 4,279,945; 4,302,523; 4,990,276; 5,252,441; 5,147,768; 5,229,259 and others.

Because all magnetic particle materials have optical constants that differ from the binders and base film used in recording elements,such magnetic particles always reduce light transmission by the recording element. The light extinction may arise from two mechanisms:

1. scattering in which all incident photons are re-emitted or deflected and 2. absorption and scattering where during absorption part of the photon energy is captured by the particle and dissipated as heat rather than being re-emitted.

The major influences on scattering and absorption are the size and distribution of sizes of the particles and their optical constants (ie., refractive indices) and also the state of dispersion or aggregation of the particles . This is related to the effective size distribution of the particles in the coating. For example, for $\gamma$-$Fe_2O_3$ and Co-$\gamma$-$Fe_2O_3$, the absorption band is generally at shorter wavelengths than 550 nm, this and the general effect of the dependence of scattering by small particles on wavelength means that these particles tend to give coated films a yellowish hue. On the other hand, for particle like magnetite, $Fe_3O_4$, cobalt surface treated magnetite, chromium dioxide, $CrO_2$, and various iron alloys, absorption process are important across the visible spectrum as taught in U.S. Pat. Nos. 4,990,276 and 5,147,768.

The scattering and absorption component can be reduced somewhat by using particles with a relatively thick shell of a low refractive index material, eg., $SiO_2$ or a fluorine containing compound as discussed in U.S. Pat. No. 5,252,441. Also, U.S. Pat. No. 5,229,259 discloses the use of thin (<10%w/w) alumino-silicate shells on core of ferromagnetic particles helps dispersion of the magnetic particles to form less agglomerated forms which would also reduce scattering.

There is a need for improved dispersion and optical properties of magnetic particles coated on or in a transparent photographic film base with the purpose of providing magnetic recording and playback or information exchange between the photographic film and another device such as a camera, a film processor or a printer. Because magnetic particles have a general tendency to reduce the transmission of light through the film base, the type, the dispersion state and the a real concentration of particles must provide:

1. high transparency and low haze in highlight areas, 2. low granularity, 3. preferred neutral density across the visible spectrum to provide "clean whites", 4. sufficient remanent magnetic moment and signal strength for recording purposes, 5. thin coatings to allow appropriate remanence and resolution between flux reversals to provide signal amplitude and resolution to allow digital recording, 6. durability in terms of abrasion and scratch resistance, and 7. controlled magnetic head/film interface cleaning and wear on peripheral devices used in manufacturing and processing and printing operations.

SUMMARY OF THE INVENTION

A photographic element having a light-sensitive layer and transparent magnetic recording layer, the transparent magnetic recording layer comprising ferromagnetic particles having a ferromagnetic core and a shell of tin oxide or metal antimonates in a binder.

The presence of a shell of tin oxide or metal antimonate on a ferromagnetic core helps the dispersion quality and yields transparent magnetic recording elements that provide low optical density, and low granularity due to the low effective particle size. Also the coating of tin oxide on the core particle provides a more neutral grey appearance that would be particularly useful in color reversal film products.

DETAILED DESCRIPTION OF THE INVENTION

The present invention will be first described with reference to the transparent magnetic layer to be used in the present invention.

The magnetic recording layer preferably has a coercive force of 400 Oe or more, the ferromagnetic powder having a coercive force of 300 Oe or more. It is more preferred that the coercive force of the recording layer is 700 Oe or more.

Examples of suitable ferromagnetic powders for use as core materials in accordance with the present invention include ferromagnetic iron oxide, cobalt surface treated ferromagnetic iron oxide, including $\gamma$-Fe203 , Co-$\gamma$-$Fe_2O_3$ and Co-magnetite; ferromagnetic chromium dioxide, ferromagnetic metal particles, ferromagnetic alloy particles, barium ferrite, strontium ferrite, and the like.

The shape and size of ferromagnetic powder are not limited specifically and can be selected widely. The ferromagnetic powder may be needle-shaped, grain shaped, spherical, cubic or tabular. Particles that are needle-shaped or tabular are preferred. The crystal size and specific surface area of the ferromagnetic powder are not limited specifically. The crystal size is preferably less than 400 Å and the specific surface area of the ferromagnetic is greater than 30 sq. m/g, preferably 35 sq m/g and most preferably greater than 40 sq m/g.

The pH of the ferromagnetic powder is not limited specifically and is preferably in the range pH 5 to pH 10. In the case of ferromagnetic iron oxide fine powder, the ratio of ferrous ($Fe^{2+}$) to ferric ($Fe^{3+}$) iron is not limited specifically.

Expressed as a percentage by weight, the ferrous ion content of the powder lies in the range of 3 to 8% by weight for cobalt-γ-Fe$_2$O$_3$ and in the range of about 10 to 24% by weight for cobalt-magnetite, preferably 11 to 20% by weight. Several kinds of ferromagnetic particles are commercially available from Toda Kogyo Corporation, Hiroshima, Japan. An example of a Co-γ-Fe$_2$O$_3$ is sold under the grade designation CSF-4085V2 and an example of a "cobalt magnetite" is sold under the grade designation ANB-170HV.

Because the desired magnetic characteristics and signal performance are obtained when the coverage of the core-shell ferromagnetic powder is minute, a suitable coverage of ferromagnetic powder is at least 4 mg/sq m, preferably 10 mg/sq m or more preferably 25 mg/sq m or greater of the transparent support. A coverage that is too high results in an increase of the optical density resulting in a number of deterimental effects including an increase in the printing time for color negative film or duller appearing highlight areas for color reversal film. Coverages greater than 3000 mg/m$^2$ should not be used. Accordingly it is desirable that the optical density in the visible spectrum due to the transparent magnetic layer is less than 0.25 and more preferably less than 0.15. The volumetric concentration of magnetic particles and other components in the magnetic layer will depend somewhat on the optimization of thickness and lay-down to provide desired signal characteristics such as output voltage, peak width, resolution and record current. Typically the magnetic layer and associated structural layers will have an effective thickness between 0.9 and 1.5 μm.

The magnetic powder core has a shell of tin oxide or a metal antimonate. The shell of a tin oxide also includes a composite oxide of tin and antimony. Metal antimonates include ZnSb$_2$O$_6$ and InSbO$_4$. The shell may cover the surface of the ferromagnetic particle in a continuous film or cover partially or entirely the surface of the ferromagnetic powder in a discontinuous film. When the shell is a composite of tin and antimony oxides, the composition can be represented by the formula Sb$_x$Sn$_{1-x}$O$_2$ where x is in the range 0.01 to 0.20, preferably 0.05 to 0.15 and most preferably 0.08 to 0.13. The amount of the shell material to be coated on the surface of the ferromagnetic core particles is in the range 0.1% to 20% by weight, preferably 0.5% to 15% by weight and most preferably 1% to 10% by weight based on the weight of the core material. If the value falls below the above specified range, the desired dispersing effect may not be obtained thereby affecting the ability to achieve low granularity and haze and increased neutral grey color. On the other hand, if the value exceeds the above specified range an increase in optical density and haze may occur.

Useful tin oxide coated ferromagnetic iron oxide powders are available from Toda Kogyo Corp, Hiroshima, Japan, for example, Toda CSF-SA3 is a tin oxide coated Co-γ-Fe$_2$O$_3$ and Toda EPB-SA7 is a tin oxide coated cobalt-magnetite. In the present invention the coating of the shell on the surface of the ferromagnetic core particles can be accomplished by stirring and mixing an aqueous suspension containing the ferromagnetic iron oxide particles and the tin oxide or metal antimonate particles, so that the tin oxide or metal antimonates in the hydrosol adhere to the surface of the iron oxide particles.

The coated particles are recovered by filtration, then washed with water, dried and calcined at a temperature range of 400° C. to 800° C.; the general procedure of which is described in U.S. Pat. No. 4,917,952, and in an article entitled "Deposition of Sn Hydrosols on Co-γ-Fe$_2$O$_3$ Magnetic Particles", published in *IEEE Transactions on Magnetics*, Vol. 27, No. 6, November 1991, page 4642, both of which are incorporated herein by reference.

Suitable metal antimonates are disclosed in U.S. Pat. No. 5,368,995 incorporated herein by reference and includes those having the rutile or rutile-related crystallographic structures and are represented by either Formula (I) or Formula (II) below:

(I) $M^{+2}Sb^{+5}_2O_6$ where $M^{2+}=Zn^{2+}$, $Ni^{2+}$, $Mg^{+2}$, $Fe^{+2}$, $Cu^{+2}$, $Mn^{+2}$, or $Co^{+2}$ (II) $M^{+3}Sb^{+5}O_4$ where $M^{+3}=In^{+3}$, $Al^{+3}$, $Sc^{+3}$, $Cr^{+3}$, $Fe^{+3}$, or $Ga^{+3}$.

Several colloidal (conductive) metal antimonates are commercially available from Nissan Chemical Company in the form of dispersions of nano-sized particles in organic and water miscible solvents. Alternatively, U.S. Pat. Nos. 4,169,104 and 4,110,247 teach a method for preparing I ($M^{+2}=Zn^{+2}$, $Ni^{+2}$, $Cu^{+2}$m $Fe^{+2}$, etc.) by treating an aqueous solution of potassium antimonate (i.e., KSb(OH)$_6$) with an aqueous solution of an appropriate soluble metal salt (e.g., chloride, nitrate, sulfate, etc.) to form a gelatinous precipitate of the corresponding insoluble hydrate of compound I. The isolated hydrated gels are then washed with water to remove the excess potassium ions and salt anions. The washed gels are peptized by treatment with an aqueous solution of organic base (e.g., triethanolamine, tripropanolamine, diethanolamine, monoethanolamine, quaternary ammonium hydroxides at a temperature of 25° to 150° C. as taught in U.S. Pat. No. 4,589,997 for the preparation of colloidal antimony pentoxide sols. Other methods used to prepare colloidal sols of metal antimony oxide compounds have been reported. A sol-gel process has been described by Westin and Nygren (*J. Mater. Sci.*, Vol. 27, pp. 1617–25, 1992) and (*J. Mater. Chem.*, Vol. 3, pp. 367–71, 1993) in which precursors of I comprising binary alkoxide complexes of antimony and a bivalent metal are hydrolyzed to give amorphous gels of agglomerated colloidal particles of hydrated I. Heat treatment of such hydrated gels at moderate temperatures (<800° C.) is reported to form anhydrous particles of I of the same size as the colloidal particles in the gels. Further, a colloidal compound I prepared by such methods can be made conductive through appropriate thermal treatment in a reducing or inert atmosphere.

For optimum performance, the magnetic recording layer should be such that normal wear will not result in signal loss after multiple reading and writing operations. Since the thickness of the magnetic layer is limited by photographic and magnetic performance criteria, abrasive particles may be present in an amount of from 1 to 16 percent by weight based on the weight of the binder present. Most preferably, the abrasive particles are present in an amount of about 1 to 6 percent based on on the weight of the binder. The abrasive particles are present in sufficient quantities in order to provide durability and to prevent clogging of the magnetic head gap. The upper limit is controlled by the effect of such particles on various apparatus the photographic film comes in contact with, such as magnetic heads, film cartridge, cameras, photofinishing devices and the like, as well as the optical characteristics of the photographic element.

The magnetic particles are present in the magnetic recording layer in an amount of from about 2 to about 10 percent by weight based upon the weight of the binder. Preferably laydown is from about 20 mg/m$^2$ to 90 mg/m$^2$.

In accordance with this invention, the transparent magnetic layer is prepared by initially forming a high solids content magnetic concentrate by mixing the magnetic particles in a suitable grind solvent together with suitable surfactants and milling in a device such as, for example, a ball mill, a roll mill, a high speed impeller mill, media mill, an attritor or a sand mill. Milling proceeds for a sufficient time to ensure that substantially no agglomerates of the magnetic particles remain. The high solids magnetic concentrate is next diluted with suitable solvents and polymeric stabilizers to maintain the particles in an unagglomerated state (subsequently referred to as the intermediate letdown). Mixing for an additional period of time is continued in order to polish the ingredients.

In a separate container, the binder polymer is dissolved in a suitable solvent. To this solution is added the intermediate letdown in accordance with the procedure set forth above and stirring is continued. A dispersion of alumina particles is prepared by milling to break up agglomerates of the abrasive alumina particles and this is added to the mixer containing the binder solution and intermediate letdown. This dispersion may be coated onto a suitable support in its present form or additional and optional ingredients such as, crosslinking agents, catalysts, coating aids, lubricants and the like, may be added before the coating operation.

The coating composition is applied to a suitable support which may contain additional layers for promoting adhesion, by any suitable coating device including slot die hoppers, slide hoppers, gravure coaters, reverse roll coaters and the like.

The magnetic layer can also be overcoated with conventional layers including antistats, protective overcoats, lubricants and the like.

Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Particularly preferred supports are polyethylene terephthalate, polyethylene naphthalate and the cellulose esters particularly cellulose triacetate.

Thickness of those supports used in the present invention is from 50 μm to 180 μm, preferably, 70 to 125 μm. In addition, various dyes may be formulated into the support or the magnetic layer to give neutral density.

Depending upon the nature of the support, suitable transparent tie or undercoat layers may be desired. Particularly with regard to polyester supports, primers are used in order to promote adhesion. Any suitable primers in accordance with those described in the following U.S. Pat. Nos. maybe employed: 2,627,088; 3,501,301; 4,689,359; 4,363,872; and 4,098,952. Each of these are incorporated herein by reference in their entirety.

The ferromagnetic pigments comprise coreshell structures with tin oxide or metal antimonates coated on ferromagnetic iron oxides, such as $\gamma\text{-Fe}_2O_3$, $Fe_3O_4$ or $\gamma\text{-Fe}_2O_3$, or $Fe_3O_4$ (magnetite) with Co, Zn or other metals in solid solution or surface treated, or ferromagnetic chromium dioxides, such as $CrO_2$ or $CrO_2$ with metallic elements, for example Li, Na, Sn, Pb, Fe, Co, Ni and Zn, or halogen atoms in solid solution. These ferromagnetic core materials may also have an intermediate thin silica coating or shell underneath the tin oxide or metal antimonate layers. Ferromagnetic metal pigments with an alumina or silica coating on their surface to improve their chemical stability or to improve dispersibility, as is commonly used in conventional magnetic recording, may also be used in accordance with the invention. The weight of the silica layer is from 0.1 to 10 percent based on the weight of the ferromagnetic core. More preferably, the weight is from 0.5 to 2 percent. Cobalt surface treated iron oxide based on $\gamma\text{-Fe}_2O_3$ or magnetite overcoated with tin oxide, tin-antimony oxide or a metal antimonate is the preferred ferromagnetic material for use in accordance with this invention.

The binders used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —NH2 —NHR, where R is an organic radical, and the like, as described in U.S. Pat. No. 3,479,310.

A dispersing agent, sometimes referred to as a wetting agent or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 0.02%, preferably 0.001 to 0.01% of the total weight of the dispersion. Useful dispersing agents include fatty acid amines, and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhone-Poulenc. Rhodafac anions are complex organic phosphate esters including alkyl a alkylaryl ethylene oxide phosphate mono- and di-esters, for example, PE510 is a nonylphenol ethoxylate phosphate in the acid form. Other constituents of the coating composition including grind solvents, coating aids, and solvents for the binder are included. Suitable grind solvents include, for example, an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dioctyl phthalate, dipropyl phthalate, and dibutyl phthalate as disclosed in U.S. Pat. No. 4,990,276 issued to Bishop et al. and assigned to the same assignee as this application.

Suitable coating aids include non-ionic fluorinated alkyl esters such as, FC-430, FC-431 sold by Minnesota Mining and Manufacturing Co., polysiloxanes such as, Dow Corning DC 1248, DC 200, DC 510, DC 190 sold by Dow Corning and BYK 310, BYK 320, and BYK 322 sold by BYK Chemie and SF 1079, SF 1023, SF 1054 and SF 1080 sold by General Electric.

Organic solvents are normally used for the preparation of the dispersion. Examples of suitable solvents are ketones, such as acetone, methyl ethyl ketone and cyclohexanone, alcohols, esters, such as ethyl acetate and butyl acetate, cellosolves, ethers, such as tetrahydrofuran aromatic solvents, such as toluene, and chlorinated hydrocarbons as solvents, such as carbon tetrachloride, chloroform, dichloromethane; tetrahydrofuran and the ketoesters of U.S. Ser. No. 08/173,833 filed Dec. 22, 1993, entitled "Coating Compositions For A Transparent Magnetic Recording Layer", by R. M. Wexler and assigned to the same assignee as the immediate application, which are preferred.

Optionally, the binder in the magnetic layer may be crosslinked employing any suitable crosslinking agent such as, for example, organic isocyanates; aziridines, as taught in U.S. Pat. No. 4,225,665; and melamines such as methoxymethylmelamine, and the like as set forth in U.S. Pat. No. 5,198,499 to Anderson et al. issued Mar. 30, 1993 and assigned to the same assignee as this application.

Any suitable organic polyisocyanate can be used as the crosslinking agent such as, tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, tysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisocyanates employed as a crosslinking agent is the reaction product of trimethylol propane and 2,4-tolylene diisocyanate sold by Mobay under the trade designation Mondur CB 75.

The transparent magnetic recording layer may also be applied from an aqueous base hydrophilic polymer binder dispersion as described in U.S. application Ser. No. 08/229, 267 filed Apr. 18, 1994, commonly assigned and incorporated herein by reference.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in *Research Disclosure,* Vol. 176, December 1978 Item 17643 and *Research Disclosure* Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in *Research Disclosure,* Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m$^2$. Concentrations of about 20 mg/m$^2$ to 30 mg/m$^2$ have been found to be particularly useful in reversal films and concentrations of about 40 mg/m$^2$ to 60 mg/m$^2$ are particularly useful in negative films.

The photographic elements according to this invention can contain one or more conducting layers such as antistatic layers and/or anti-halation layers such as such as described in *Research Disclosure,* Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide and metal antimonates, such as, $ZnSb_2O_6$ and $InSbO_4$.

The photographic elements according to this invention can be provided with a protective or lubricating layer, such as a wax layer, on or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

The invention will be further illustrated by the following examples in which parts and percentages are given by weight unless otherwise specified.

EXAMPLES

The ferromagnetic iron oxide pigments used in the examples below are listed in Table 1.

TABLE 1

Magnetic Pigments

| Name | Type | SSA ($m^2/g$) | % $Fe^{2+}$ | % $SnO_2$ | Hc (Oe) | Specific Magnetic Moment $\sigma_s$ (emu/g) |
|---|---|---|---|---|---|---|
| Examples: | | | | | | |
| Toda Kogyo Corp Pigments | | 43.8 | 4% | 3.25 | 793 | 73.7 |
| CSF-SA3: | Co-$\gamma$-$Fe_2O_3$/$SnO_2$ | | | | | |
| EPB-SA7 | Co—$Fe_3O_4$/$SnO_2$ | 47.4 | >10.3% | 3.20 | 768 | 77.7 |
| Comparative Examples: | | | | | | |
| CSF-4085V2: | Co-$\gamma$-$Fe_2O_3$ | 40.6 | 4.0 | none | 829 | 76.5 |
| ANB-170HV | Co—$Fe_3O_4$ | 31.1 | 17.5 | none | 730 | 84.2 |

EXAMPLE 1

A cellulose diacetate/cellulose triacetate binder with magnetic particles comprised of a Co-$\gamma$-$Fe_2O_3$ magnetic core with a tin oxide shell at 3.2% by weight on the total weight of the oxide powder is coated to a dry thickness of 1.2 gm onto a subbed polyethylene terephthalate base from a dispersion composition as shown in Table 2.

This dispersion is prepared by adding the respective particle dispersions with the respective stabilizing agents and solvents to a cellulose diacetate solution in methylene chloride/acetone/methyl acetoacetate using a high shear mixer. A coating aid is then added with low shear. Subsequently, the cast layer is overcoated with 27 mg/sq m of carnauba wax from a warm toluene solution.

TABLE 2

| Dispersion Ingredient | Function | Percent |
|---|---|---|
| Cellulose Diacetate | Binder | 2.60 |
| Cellulose Triacetate | Binder/Dispersion Stabilizer | 0.136 |
| CSF-SA3 (Toda Kogyo) | Magnetic Particle | 0.136 |
| Rhodofac PE-510 (Rhone-Poulenc) | Dispersant | 0.0095 |
| Di-butyl Phthalate | Grind Solvent | 0.261 |
| AKP-50 (Sumitomo) | 0.2 μm Abrasive | 0.047 |
| Solsperse 24000 (Zeneca Ltd) | Polymeric Dispersant | 0.004 |
| Mondur CB-75 (Miles Corp.) | Cross Linker | 0.26 |
| Stannous Octoate | Catalyst | 0.013 |

TABLE 2-continued

| Dispersion Ingredient | Function | Percent |
|---|---|---|
| FC-431 (3M Corp.) | Coating Aid | 0.015 |
| Methylene Chloride | Solvent | 67.566 |
| Acetone | Solvent | 24.131 |
| Methyl Acetoacetate | Solvent | 4.826 |

EXAMPLE 2

A cellulose diacetate/cellulose triacetate binder with magnetic particles comprised of a cobalt-magnetite (Co-$Fe_3O_4$) core with a tin oxide shell (3.2% on total weight of powder) is coated to a dry thickness of 1.2 gm onto a subbed polyethylene terephthalate base from a dispersion composition as shown in Table 3. The dispersion is prepared by adding the respective particle dispersions with the respective stabilizing agents and solvents to a cellulose diacetate solution in a methylene chloride/acetone/methyl acetoacetate solvent mixture using a high speed mixer. A coating aid is then added with low shear mixing to avoid foaming prior to coating. Subsequently, the cast magnetic layer is overcoated with 27 mg/$m^2$ of carnauba wax.

TABLE 3

| Dispersion Ingredient | Function | Percent |
|---|---|---|
| Cellulose Diacetate | Binder | 2.55 |
| Cellulose Triacetate | Binder/Dispersion Stabilizer | 0.133 |
| EPB-SA7 | Magnetic Particle | 0.133 |
| Rhodofac PE-510 | Dispersant | 0.0133 |
| Di-butyl Phthalate | Grind Solvent | 0.2374 |
| AKP-50 | 0.2 μm Abrasive | 0.114 |
| Solsperse 24000 | Polymeric Dispersant | 0.058 |
| Mondur CB-75 | Cross Linker | 0.25 |
| Stannous Octoate | Catalyst | 0.0125 |
| FC-431 | Coating Aid | 0.015 |
| Methylene Chloride | Solvent | 67.574 |
| Acetone | Solvent | 24.133 |
| Methyl Acetoacetate | Solvent | 4.826 |

COMPARATIVE EXAMPLE C-1

A cellulose diacetate/cellulose triacetate binder with magnetic particles without a tin oxide shell ( e.g., Toda CSF4085V2 Co-$\gamma$-$Fe_2O_3$ ) and abrasive particles is cast to a dry thickness of about 1.2 μm onto subbed polyethylene terephthalate from a dispersion composition as shown in Table 4. The dispersion is prepared in a similar manner to Example 1 with dispersants, binders, crosslinking agents and a coating aid. Subsequently, the dry coating is overcoated with 27 mg/m² of carnauba wax.

TABLE 4

| Dispersion Ingredient | Function | Percent |
|---|---|---|
| Cellulose Diacetate | Binder | 2.60 |
| Cellulose Triacetate | Binder/Dispersion Stabilizer | 0.13 |
| CSF-4085V2 | Magnetic Particle | 0.13 |
| Rhodofac PE-510 | Dispersant | 0.0065 |
| Di-butyl Phthalate | Grind Solvent | 0.26 |
| AKP-50 | 0.2 μm Abrasive | 0.047 |
| Solsperse 24000 | Polymeric Dispersant | 0.004 |
| Mondur CB-75 | Cross Linker | 0.26 |
| Stannous Octoate | Catalyst | 0.013 |
| FC-431 | Coating Aid | 0.015 |
| Methylene Chloride | Solvent | 67.576 |
| Acetone | Solvent | 24.134 |
| Methyl Acetoacetate | Solvent | 4.826 |

COMPARATIVE EXAMPLE C-2

A cellulose triacetate binder with magnetic particles without a tin oxide shell Toda ANB-170HV, cobalt-magnetite) is cast to a dry thickness of about 1.2 gm onto subbed polyethylene terephthalate from a dispersion composition as shown in Table 4. The dispersion is prepared in a similar manner to Example 2 by adding a concentrate grind phase, including dispersant and solvent, dibutyl phthalate, to a 10 solution of cellulose acetate in 95% methylene chloride, 5% n-butanol. Subsequently, the dry coating was overcoated with a thin lubricating layer of pentaerythrityl tetrastearate.

TABLE 5

| Dispersion Ingredient | Function | Percent |
|---|---|---|
| Cellulose Triacetate | Binder/Dispersion Stabilizer | 2.00 |
| ANB-170HV | Magnetic Particle | 0.10 |
| Rhodofac PE-510 | Dispersant | 0.0045 |
| Dibutyl Phthalate | Grind Solvent | 0.1817 |
| Methylene Chloride | Solvent | 92.828 |
| N-butanol | Solvent | 4.886 |

EVALUATION METHODS

OPTICAL DENSITY/COLOR BALANCE.

The optical density $[OD=\log_{10}(I_o/I_t)]$ is measured for polyester film base without magnetic coatings and for polyester film base with magnetic coatings. At these particle laydowns, light attenuation or the change in OD at a particular wavelength is linear with particle laydown. The optical density owing to the various particles in the magnetic layer is obtained by difference. The attenuation is due to all particles, both magnetic and abrasive (if included). The specific optical density,(OD/(wt of abrasive particles/unit area))of the abrasive (Sumitomo Chemical Corp, AKP-50) is determined to be 0.00504, 0.00292 and 0.00166 sq ft/mg at 450, 550 and 650 nm respectively from a calibration series of coatings. The optical density due to the magnetic particles alone is obtained by subtracting the density due to the alumina particles, computed from the alumina laydown for each coating, and the its specific optical density.

GREYNESS INDEX

An estimate of the color balance or neutrality of the magnetic particles in the coated layer is obtained by making a ratio of the area under the OD vs wavelength spectrum from 450 nm to 650 nm and the area defined by the lowest optical density (at 650 nm) times the wavelength range from 450 nm to 650 nm. For a perfectly neutral density coating the greyness index has value of 1.00.

GRANULARITY/POWER SPECTRUM.

The graininess or granularity of a photograph or photographic film base is measured from the Wiener (or power) spectrum of micro-densitometer scans of the film. The example films and comparative examples are listed in Table 6 as the NPS power at a spatial frequency of 20 cycles/mm.

The Wiener spectrum (WS) data are acquired on a scanning microdensitometer using the Wratten 94A (blue) color filter. The spectral response of the instrument with this filter in place is nominally a Status M blue response. An influx objective of magnification of 10× and a numerical aperture 0.3 is used in combination with a 5× ocular to form an illuminated region 40.0 micrometers wide by 420.0 micrometers long. An efflux objective of magnification 5× and numerical aperture 0.1 is used in combination with a 20× ocular to form a detected region of 7.6 micrometers wide by 305.3 micrometers long. An area of dimensions 16.4 millimeters by 22.0 millimeters is scanned at a sampling increment of 2 micrometers along the scan direction and 305 micrometers along the vertical direction, yielding 72 lines of 8192 samples each. A 4-pole Butterworth electronic frequency filter is included in the microdensitometer detection system. The Butterworth filter is set to a spatial frequency cutoff (3 dB attenuation) of 250 cycles/mm. The electronic frequency filter ensures minimum aliasing (<1%) in the spatial frequency band of interest. Each sample area is scanned twice to provide data for instrument noise reduction using cross spectral analysis ([1] Y. Lee and P. L. P. Dillon, *Proc. SPIE* 767, 250 (1987); [2] P. C. Bunch and R. VanMetter, *Appl. Opt.* 27, 3468 (1988)).

The Weiner spectrum is computed in accordance with procedures given by Dainty and Shaw (J. C. Dainty and R. Shaw, "Image Science" Academic Press, New York, 1974, Chapter 8). First, the density data are converted to transmittance values. For each scan, a 915.9 micrometer long scanning slit is synthesized by averaging vertically adjacent samples over 3 scan lines. The resulting 24 scan lines are then segmented into blocks of 256 samples each. The 768 blocks from each scan are then used to form a cross-spectral estimate in transmittance units, using a standard algorithm (J. S. Bendat and A. G. Piersol, "Random Data: Analysis and Measurement Procedures", Wiley, New York, 1980, Chapter 10) based on the Fast Fourier Transform. The spectrum is then corrected for the Modulation Transfer Functions of the scanning slit, the efflux optics and the electronic frequency filter. Finally, the transmittance WS is converted to a density WS by a linear approximation. The result is an estimate of the sample WS in the density metric, with instrument noise suppressed, at 1.95 cycles/nm increments over the band 0–60 cycles/mm.

Haze Measurement

The haze of cast layers is evaluated with an XL-211 Hazegard System by measuring transmitted light on a percentage basis for any light deviating by more than 2.5° C. from the incident beam using an integrating sphere to detect light scattered by more than 2.5 degrees off axis.

Another estimate of %haze, which gives very similar results to the Hazegard measurements, is determined by measuring the optical density with a fiber optic spectrophotometer with a low light collection angle, e.g., Guided Wave Model GW-300. This is conveniently arranged using optical fibers of 500 μm or less diameter with the fiber terminations separated by more than 150 mm. The acceptance angle is about 0.382 degrees. Using a wavelength of 650 nm, where there is essentially no absorption of light, attenuation being due to scattering, another %haze parameter is defined as %haze=$100*(1-10^{-OD})$.

TABLE 6

Examples 1 and 2 and Comparative Examples C-1 and C-2

| Example | Type | % SnO$_2$ w/w | Specific Optical Density OD/(mg Magnetic Particles/ft$^2$) @ 450 nm | @ 550 nm | @ 650 nm | Greyness Index | Granularity Spectral Dens. (D$^2$ mm$^2$) | Mag Laydown mg/sq ft | Al$_2$O$_3$ Laydown mg/sq ft | % Haze** |
|---|---|---|---|---|---|---|---|---|---|---|
| Ex-1 | Co-γ-Fe$_2$O$_3$ | 3.25 | 0.02083 | 0.01035 | 0.0054 | 0.443 | 0.54*10$^{-8}$ | 4.94 | 2 | 6.0 |
| Ex-2 | Co—Fe$_3$O$_4$ | 3.2 | 0.01804 | 0.01045 | 0.0059 | 0.515 | 0.48*10$^{-8}$ | 5.20 | 5 | 6.8 |
| Ex C-1a | Co-γ-Fe$_2$O$_3$ | — | 0.02316 | 0.01108 | 0.00534 | 0.405 | 0.37*10$^{-8}$ | 5.00 | 5 | 6.0 |
| Ex C-1b | | — | 0.02228 | 0.01081 | 0.00519 | 0.407 | 0.37*10$^{-8}$ | 4.57 | 5 | 5.3 |
| Ex C-2 | Co—Fe$_3$O$_4$ | — | 0.0235 | 0.0182 | 0.0118 | 0.667 | 1.20*10$^{-8}$ | 4.14 | — | 10.7 |

*To convert mg/sq ft to mg/m$^2$ divide by 0.0929.
**% haze was calculated from the optical density at 650 nm.

From Table 6 it can be seen that both the tin oxide coated particles of Examples 1 and 2 exhibit higher greyness than the particle in Example C-1 in which is a typical Co-γ-Fe$_2$O$_3$ fine ferromagnetic powder. All these examples show low granularity ie, the spectral density is less than 0.8*10$^{-8}$ (D$^2$ mm$^2$) at a spatial frequency of 20 cycles/mm. All of these examples have a %haze value of less than 8, normally the %haze is expected to be less than 8 for this type of transparent magnetic media. Comparative example C-2 employing Co-magnetite shows a higher greyness index compared to the other examples, however, the other key properties of granularity and % haze and specific optical density of this particle are inferior to the other examples.

Thus the tin oxide coated ferromagnetic oxides offer and advantage of a more neutral color and equivalent granularity, percent haze and magnetic characteristics compared with uncoated particles, such as Co-γ-Fe$_2$O$_3$, used for transparent magnetic layers as elements of photographic film base.

A color photographic recording material for color negative development is prepared by applying the following layers in the given sequence to the opposite side of each of the supports of Examples 1 and 2 and Comparative Examples 1 and 2 respectively. The quantities of silver halide are given in grams (g) of silver per m$^2$. The quantities of other materials are given in g per m$^2$.

Layer 1 {Antihalation Layer} black collodial silver sol containing 0,236 g of silver, with 2.44 g gelatin.

Layer 2 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 5 {Interlayer} Yellow dye material YD-1 at 0.11 g and 1.33 g of gelatin

Layer 6 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 7 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 8 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 9 {Interlayer} Yellow dye material YD-2 at 0.11 g with 1.33 g gelatin.

Layer 10 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 11 {Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-10.022 g, DIR compound D-5 at 0.05 g, BAR compound B-1 at 0.006 g with gelatin at 1.97 g.

Layer 12 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The formulas for the component materials are as follows:

C-1:
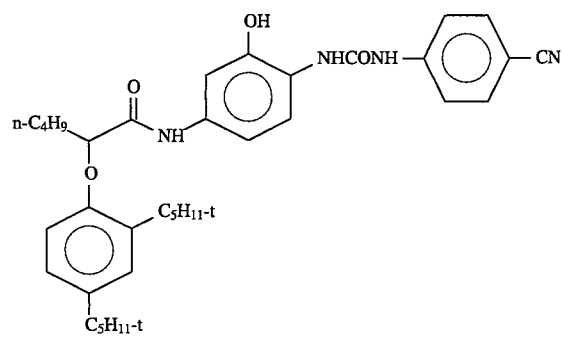

CM-1
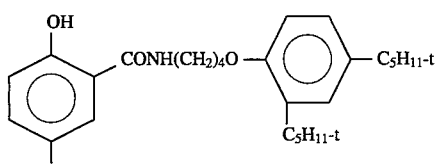

B-1
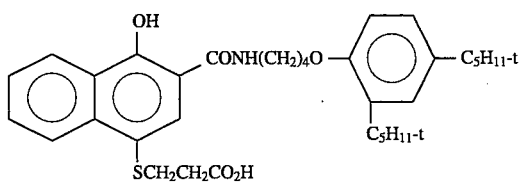

D-1:
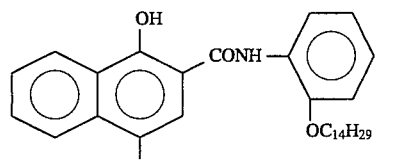

D-2
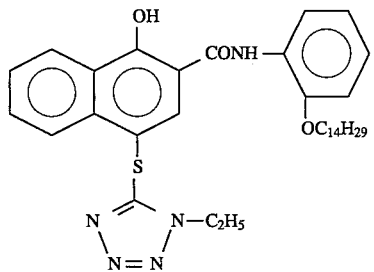

-continued
D-3: 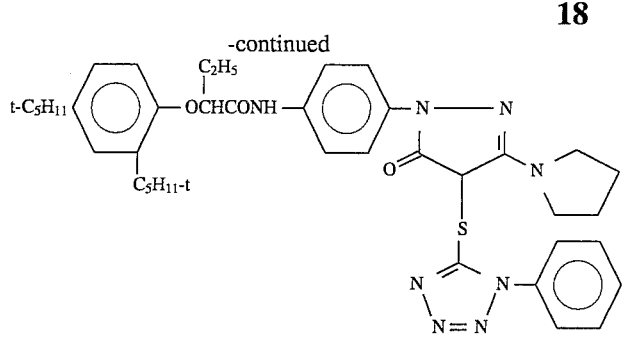
D-4 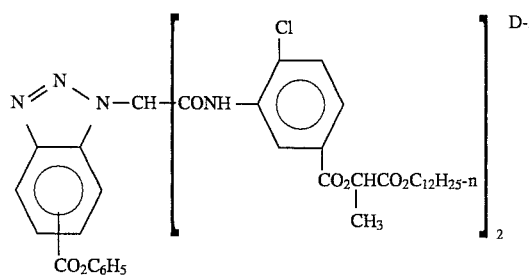
D-5: 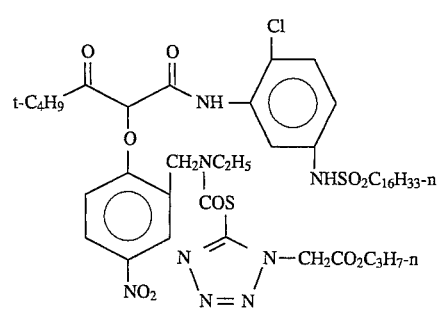
MM-1 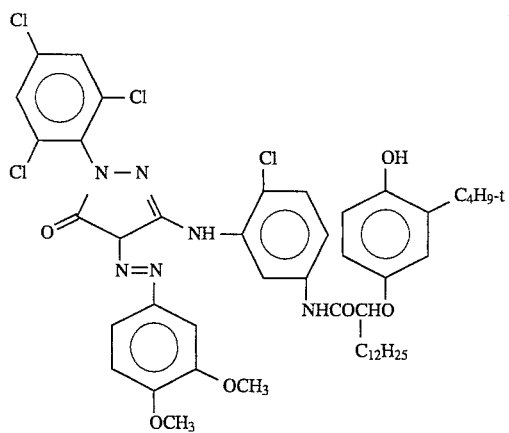
Y-1: 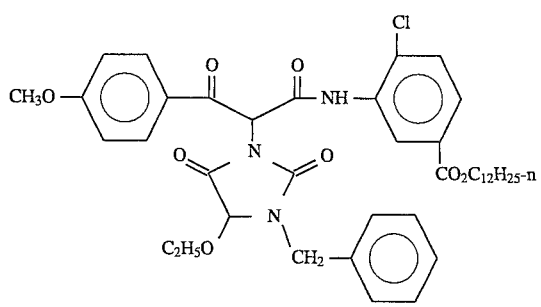
Y-2: 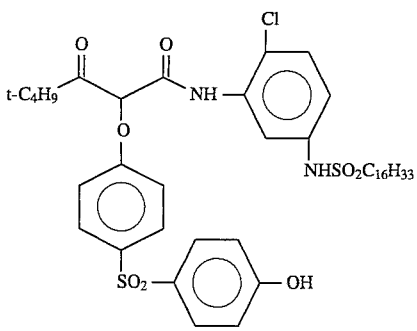
M-1: 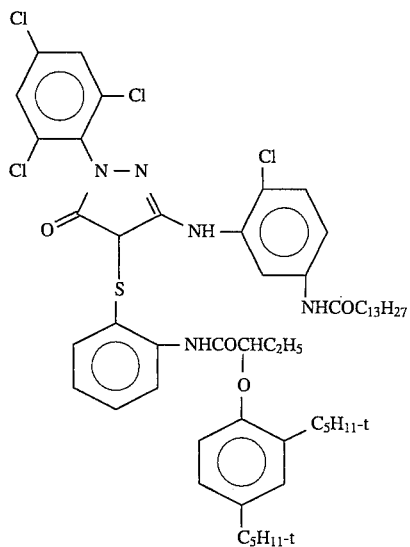

Examples 3, 4, C-3, and C-4 show comparable results to those presented above with respect to Examples 1, 2, C-1, and C-2.

The quantity of the tin oxide coated magnetic particles, at these levels do not interfere significantly with the optical qualities of the photographic element.

The invention has been described in detail with particular reference to preferred embodiments thereof, but it will be understood that variations and modifications can be effected within the spirit and scope of the invention.

What is claimed is:

1. A photographic element having a light-sensitive layer and a transparent magnetic recording layer, the transparent magnetic recording layer comprising ferromagnetic particles having a ferromagnetic core and a shell of tin oxide or metal antimonate in a binder.

2. The photographic element of claim 1 wherein the shell is tin oxide.

3. The photographic element of claim 2 wherein the tin oxide is an antimony doped tin oxide.

4. The photographic element of claim 1 wherein the shell is a metal antimonate.

5. The photographic element of claim 4 wherein the metal antimonate has the formula $M^{+2}Sb^{+5}_2O_6$ or $M^{+3}Sb^{+5}O_4$ where $M^{+2}$ is $Zn^{+2}$, $Ni^{+2}$, $Mg^{+2}$, $Fe^{+2}$, $Cu^{+2}$, $Mn^{+2}$ or $Co^{+2}$, and $M^{+3}$ is $In^{+3}$, $Al^{+3}$, $Sc^{+3}$, $Cr^{+3}$, $Fe^{+3}$, or $Ga^{+3}$.

6. The photographic element of claim 4 wherein the metal antimonate is $ZnSb_2O_6$.

7. The photographic element of claim 4 wherein the metal antimonate is $InSbO_4$.

8. The photographic element of claim 1 wherein the shell material is from 0.1 to percent by weight based on the weight of the core.

9. The photographic element of claim 1 wherein the shell material is from 0.5 to 15% by weight based on the weight of the core.

10. The photographic element of claim 1 wherein the shell material is from 1 to 10% by weight based on the weight of the core.

11. The photographic element of claim 1 wherein the ferromagnetic core is iron oxide.

12. The photographic element of claim 11 wherein the iron oxide is Co-surface treated iron oxide.

13. The photographic element of claim 1 wherein the ferromagnetic particles are present in an amount of from 1:2 to 1:100 based on the weight of the binder.

14. The photographic element of claim 1 wherein the ferromagnetic core is magnetic iron oxide containing $Fe^{2+}$ in an amount of 3–24 wt % of the ferromagnetic core.

15. The photographic element of claim 1 wherein the ferromagnetic core is cobalt-modified magnetic iron oxide containing $Fe^{2+}$ in an amount of 3–24 wt. % of the ferromagnetic core.

16. The photographic element of claim 1 wherein the ferromagnetic core is chromium dioxide.

17. The photographic element of claim 1 wherein a silicon dioxide layer is disposed between the ferromagnetic core and the shell.

18. The photographic element of claim 17 wherein the silicon dioxide layer is from 0.1 to 10 percent by weight based on the weight of the core.

19. The photographic element of claim 17 wherein the silicon dioxide layer is from 0.5 to 2 percent by weight based on the weight of the core.

* * * * *